US005409248A

United States Patent [19]
Williams

[11] Patent Number: 5,409,248
[45] Date of Patent: Apr. 25, 1995

[54] BICYCLE SUSPENSION

[76] Inventor: Richard L. Williams, 1050 Sunrise Ct., Lyons, Colo. 85040

[21] Appl. No.: 98,754

[22] Filed: Jul. 28, 1993

Related U.S. Application Data

[63] Continuation of Ser. No. 743,609, Aug. 12, 1991, abandoned.

[51] Int. Cl.⁶ .................................. B62K 25/28
[52] U.S. Cl. .................................. 280/284; 280/283; 188/285; 267/34
[58] Field of Search ............... 280/283, 284, 285, 286, 280/288, 275, 276; 180/227; 188/285, 266; 267/34, 64.25

[56] References Cited

U.S. PATENT DOCUMENTS

| Re. 13,383 | 3/1912 | Harley ................... 280/283 |
| 602,354 | 4/1898 | Ohlgart ................... 280/276 |
| 644,957 | 3/1900 | Williams ................... 280/284 |
| 667,594 | 2/1901 | Soucy ................... 280/284 |
| 1,068,583 | 7/1913 | Harley ................... 280/284 |
| 1,071,892 | 9/1913 | Diepenhorst et al. ............. 280/284 |
| 2,483,429 | 10/1949 | Pierce ................... 267/34 |
| 3,877,539 | 4/1975 | Tilkens ................... 280/284 |
| 4,582,343 | 4/1986 | Waugh ................... 280/284 |
| 4,971,344 | 11/1990 | Turner ................... 280/276 |
| 5,131,671 | 7/1992 | Wilhelms ................... 280/201 |

FOREIGN PATENT DOCUMENTS

| 0420610 | 4/1991 | European Pat. Off. ........... 280/276 |
| 0843817 | 7/1939 | France ................... 280/276 |
| 1041249 | 10/1953 | France ................... 280/284 |
| 0366977 | 7/1939 | Italy ................... 280/284 |
| 0411696 | 5/1945 | Italy ................... 280/284 |
| 0109894 | 10/1917 | United Kingdom ............. 280/284 |
| 8600675 | 1/1986 | WIPO ................... 188/285 |

Primary Examiner—Margaret A. Focarino
Assistant Examiner—Anne Marie Boehler
Attorney, Agent, or Firm—Harold A. Burdick

[57] ABSTRACT

An improved bicycle suspension system and method are disclosed which provides a fully, or rear wheel only, suspended bicycle having improved shock absorbing characteristics. The system utilizes a portion of the hollow, horizontally disposed linear main frame member which extends from just below the seat to the handle bar assembly as an integral part of a hydraulic or pneumatic shock absorber. The portion is sealed against fluid leakage and has a piston assembly slidably positioned therein, the piston assembly being linked by a single link unit to a rear wheel supporting framework which is also pivotably connected with the main frame above the chain line at a structural support joined to the two lower structural main frame members adjacent to the foot crank assembly. A load adjustable spring assembly is positioned in the portion and connected with the piston assembly, with spring preload being adjustable from the exterior of the shock absorber.

16 Claims, 2 Drawing Sheets

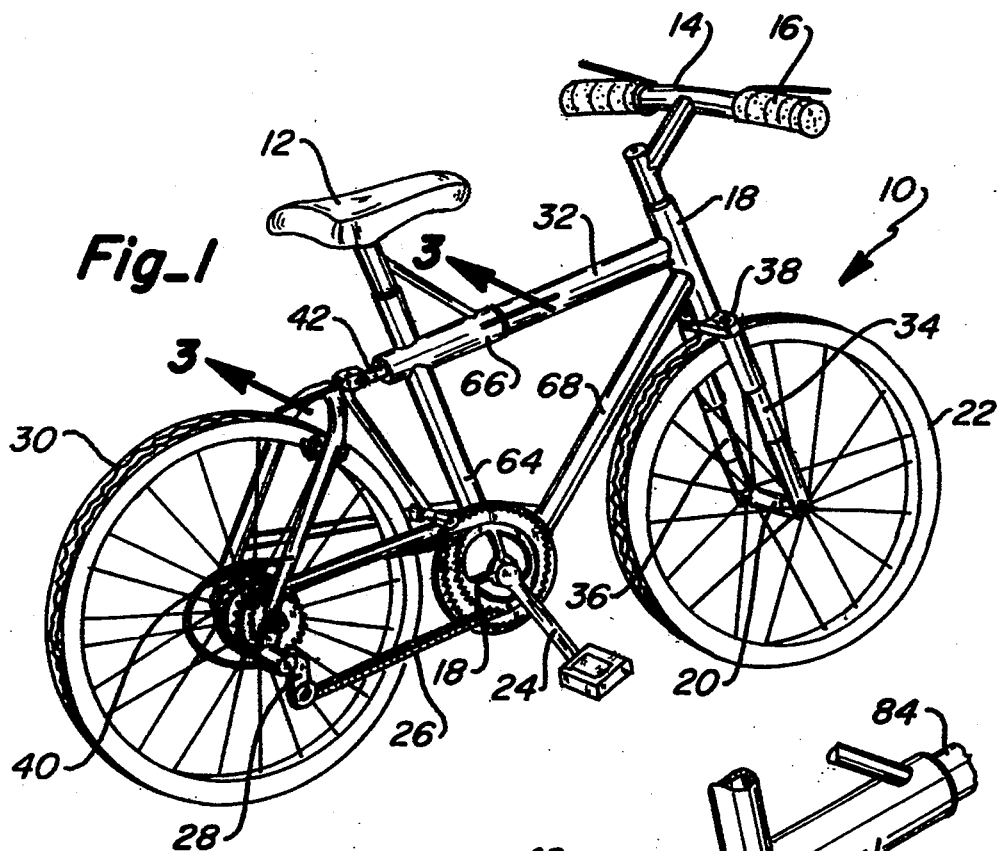
Fig_1
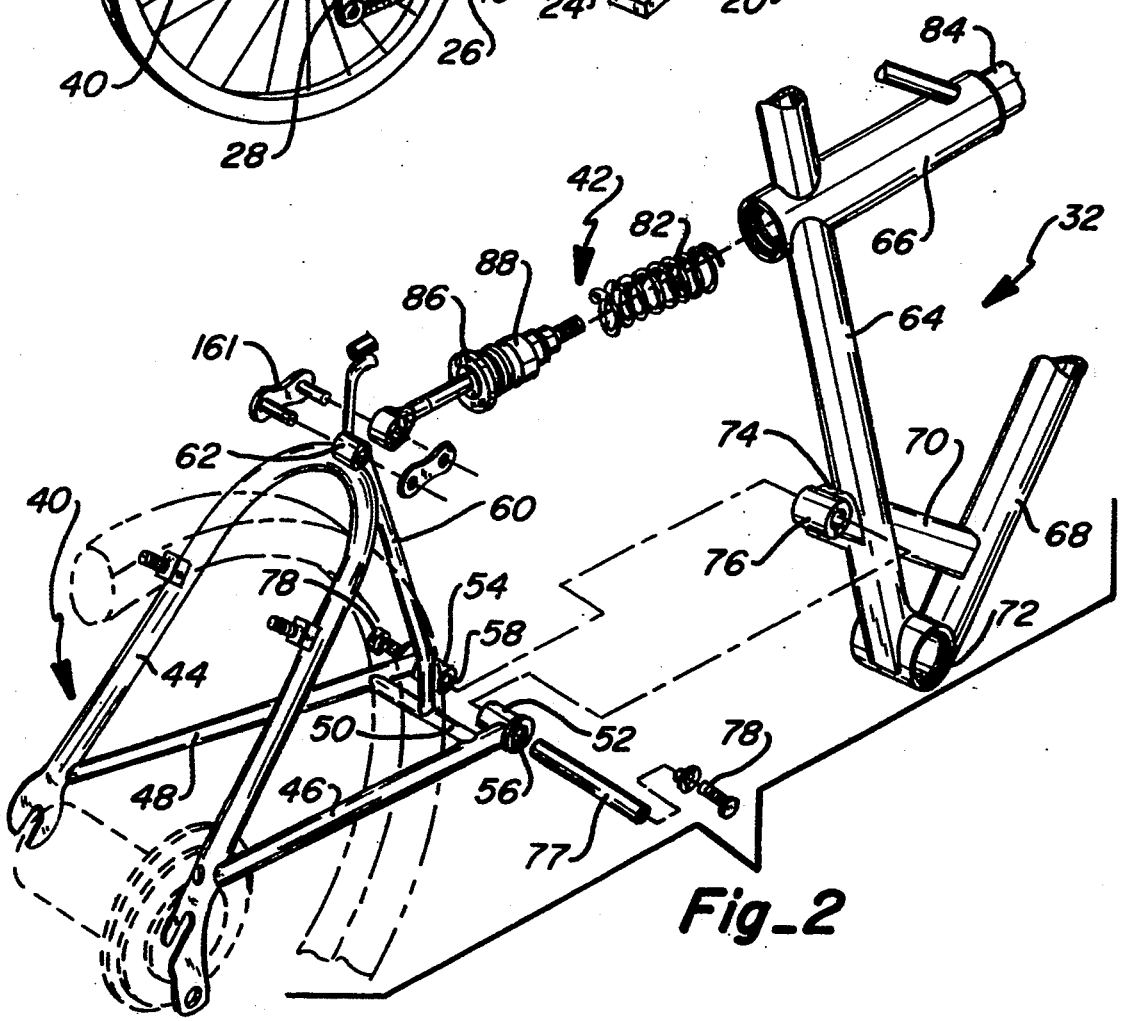
Fig_2

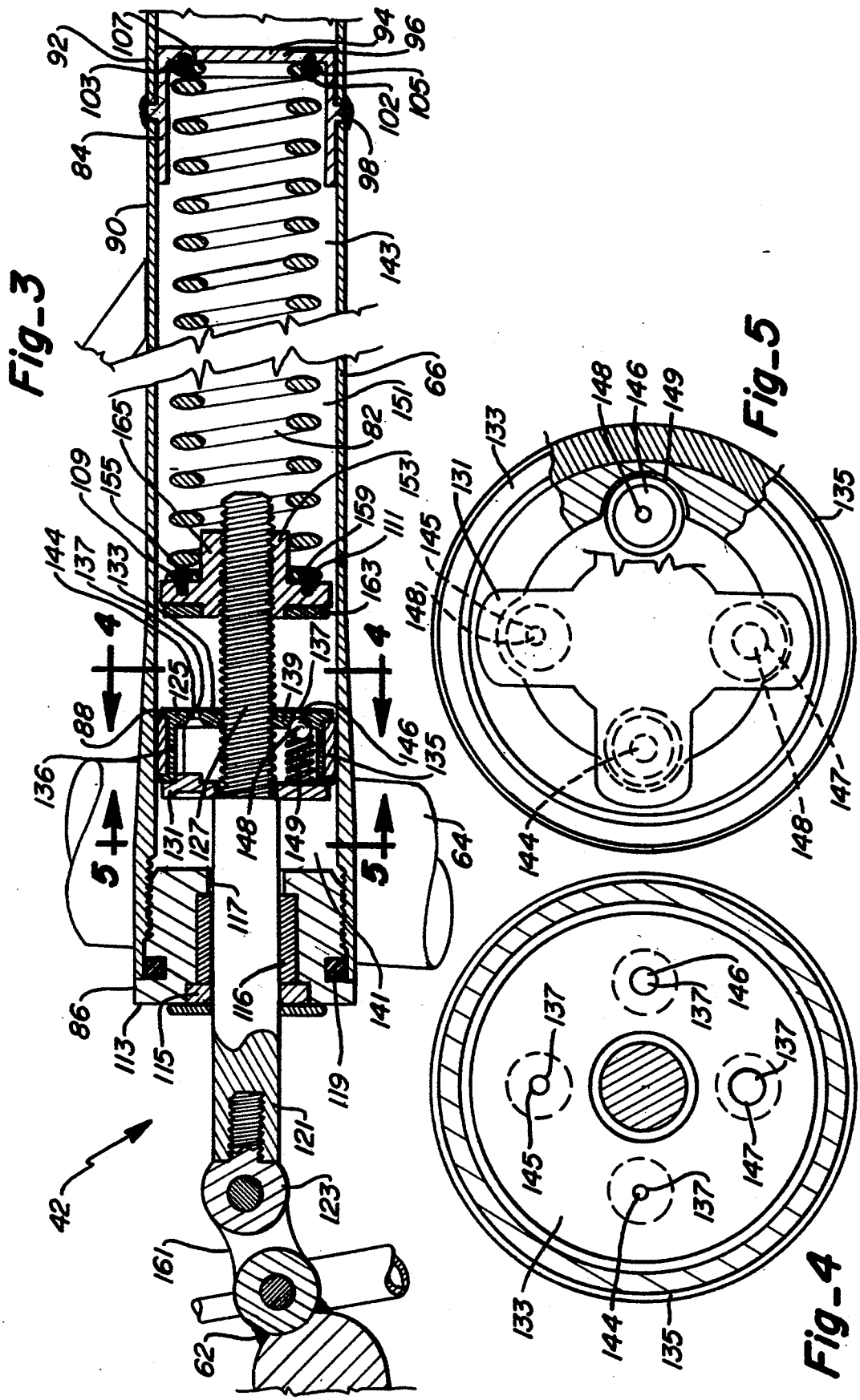

BICYCLE SUSPENSION

RELATED APPLICATION

This application is a Continuation of U.S. patent application Ser. No. 07/743,609 filed Aug. 12, 1991, by Richard L. Williams, and entitled BICYCLE SUSPENSION, now abandoned.

FIELD OF THE INVENTION

This invention relates to suspension systems and methods and, more particularly, relates to such systems and methods for bicycles.

BACKGROUND OF THE INVENTION

Suspension systems and methods for two wheeled vehicles have heretofore been suggested and/or utilized which incorporate various kinds of shock absorbers (see for example U.S. Pat. Nos. 4,582,343, 644,957, 1,071,892, 1,068,583, and 3,877,539). Some such systems have proposed utilization of spring units in the reach-bar, and/or have proposed oil dampened shock absorbing mechanisms in or adjacent to other parts of the frame.

Such systems and methods as have been heretofore suggested could, however, be improved to provide better response and more durable design, for example, by providing for oil dampened shock absorbing in a linear main frame member, preferably the normally horizontally disposed reach-bar, which contains all of the oil necessary to the shock absorber, by providing for a range of adjustability of system response characteristics to road conditions, by simplifying linkage between the shock absorbing assembly and the rear wheel mounting framework, by preserving design lines and eliminating cumbersome additional structure, and by providing additional structural support for pivotable mounting of the rear wheel mounting framework at the main frame.

SUMMARY OF THE INVENTION

This invention provides an improved bicycle suspension system and method wherein the system includes a piston which is connected with a rear wheel mounting framework and which is slidably positioned in a main frame linear structural member, and first and second sealing units being positioned in spaced locations in the linear structural member so that the sealing units are disposed on opposite sides of the piston therein relative to one another for sealing a portion of the linear structural member against movement of fluid from a piston housing defined thereby. The linear structural member includes first and second substantially linear sections, the first sealing unit sealing one end of the first linear section and the second sealing unit sealing an opposite end of the first section while also rigidly joining the first section to the second section.

An adjustable shock response mechanism is positioned adjacent to the piston in the linear structural member and is selectively positionable relative thereto to provide a range of user selected system response characteristics to road conditions. The piston is connected with a shaft, the shaft being also releasably connected with the framework at one end, the shaft having a manipulable portion adjacent to the end for user adjustment of the relative positions of the piston and the mechanism.

A spring is mounted between the mechanism and one of the sealing means in such a fashion so as to prevent rotation of the spring. A single link unit is utilized for connecting the shaft to the framework for translating arcuate motion of the framework to linear motion of the shaft. The main frame includes a plurality of structural members including a first member having the bicycle seat at one end thereof and the foot crank assembly at the other end thereof, a hollow second member extending from the first member below the seat to the handlebar assembly, a third member extending from the handlebar assembly to the foot crank assembly, and a fourth member attached to the third member and to the first member at a position spaced a selected distance from the foot crank assembly, the fourth member having a part extending beyond the first member. The rear wheel framework is pivotably connected with the part of the fourth member of the main frame.

It is therefore an object of this invention to provide an improved bicycle suspension system and method.

It is another object of this invention to provide an improved method for absorbing shock encountered by a bicycle moving over an uneven surface.

It is another object of this invention to provide an improved suspension system for a bicycle which includes a piston slidably positioned in a linear structural member of the bicycle's main frame, a portion of the linear structural member being sealed at opposite sides of the piston against movement of fluid from a piston housing defined thereby.

It is still another object of this invention to provide a suspension system for a bicycle wherein a portion of a linear structural member of the bicycle's main frame includes first and second substantially linear sections, the first section being sealed at both ends to provide a piston housing, a sealing unit being utilized for sealing one end and also rigidly joining the first section to the second section of the linear structural member.

It is yet another object of this invention to provide an improved suspension system for a bicycle which includes an adjustable shock response mechanism for providing a range of user selected system response characteristics to road conditions.

It is still another object of this invention to provide an improved suspension system for a bicycle which includes a shock absorber connected with a pivotable rear wheel mounting framework by a single link unit.

It is yet another object of this invention to provide a suspension system for a bicycle having a foot crank assembly, a handlebar assembly, a seat and wheels, the suspension system including a main frame having a plurality of structural members including a first member having the seat adjacent to one end thereof and the foot crank at another end thereof, a hollow second member extending from the first member below the seat to the handlebar assembly, a third member extending from the handlebar assembly to the foot crank assembly, and a fourth member attached to the third member and to the first member at a position spaced a selected distance from the foot crank assembly, the fourth member having a part extending beyond the first member, a rear wheel framework pivotably connected with the part of the fourth member of the main frame, and a shock absorber connected with the rear wheel framework and the main frame.

It is yet another object of this invention to provide an improved suspension system for a bicycle which includes shock absorbers for both the front and rear wheels of the bicycle.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view of an off-road type bicycle including the suspension system of this invention;

FIG. 2 is a partial exploded view of the suspension system of FIG. 1;

FIG. 3 is a sectional view taken through section lines 3—3 of FIG. 1;

FIG. 4 is a sectional view taken through section lines 4—4 of FIG. 3; and

FIG. 5 is a sectional view taken through section lines 5—5 of FIG. 3.

DESCRIPTION OF THE INVENTION

FIG. 1 illustrates the suspension system of this invention in association with an off-road type of bicycle (frequently referred to as a mountain bike). Bicycle 10 includes seat assembly 12, handlebar assembly 14 including handlebars 16 and mounting stem 18, foot crank assembly 18, and front wheel mount 20 having front wheel 22 mounted thereon.

Foot crank assembly 18 includes pedal assemblies 24 normally connected to a bearing and drive gear assembly in a conventional manner. Chain 26 is mounted between crank assembly 18 and derailer assembly 28 for driving rear wheel 30.

The suspension system of this invention includes main frame 32, front wheel shock absorbers 34 and 36 mounted between front wheel mount 20 and support arm 38 connected to stem 18, rear wheel mounting framework 40 and rear wheel shock absorbing mechanism 42.

Shock absorbers 34 and 36 can be any type of known shock absorber, though air spring, oil dampened type shock absorbers are preferred. As illustrated in FIG. 2, rear wheel mounting framework 40 includes framework member 44 for supporting the rear wheel axle, member 44 being connected with reach members 46 and 48 having a stabilizing and mounting bar 50 connected thereto. Reach members 46 and 48 have mounting barrels 52 and 54 connected therewith, respectively, and preferably include bearing structures 56 and 58 therein, respectively. Spanning member 60 is connected between bar 50 and member 44 and includes mounting barrel 62 at one end thereof. The various members are connected in a conventional fashion, for example by welding or the like.

Main frame 32 includes substantially linear framework members 64, 66 and 68. Framework member 64 extends between seat assembly 12 and foot crank assembly 18, member 66 extends from member 64 just below seat assembly 12 to handlebar assembly 14, and member 68 extends from handlebar assembly 14 to crank assembly 18. At least framework member 66 is formed of a substantially hollow cylindrical material, the members being connected, for example, by welding.

Framework member 70 is connected so as to extend to a point above bearing mount 72 of foot crank assembly 18. Member 70 is welded at one end with member 68 and adjacent to its opposite end to member 64. Member 70 includes a part 74 which extends beyond, and rearward of, member 64 and includes mounting barrel 76 connected thereto. Barrel 76 is receivable between barrels 52 and 54 and held in place by pivot 77 and retainer assemblies 78 for pivotable connection of framework 40 to main frame 32, the point of connection at part 76 being above chain 26. In this manner additional strength (and thus durability) is provided to main frame 32 at the connecting point while positioning the connection point above the foot crank assembly and chain so that pedalling energy is not expended in the suspension system of this invention.

Turning to FIGS. 2 through 5, the shock absorbing mechanism 42 is illustrated in more detail. Mechanism 42 includes spring 82 (made of spring steel having a selected stiffness), sealing and connecting unit 84, sealing unit 86, and piston assembly 88. Linear structural member 66 includes first and second linear sections 90 and 92, respectively. Sealing and connecting unit 84 includes cylindrical cap 94 having closed end 96 and an annular ridge 98 defined therearound. Cap 94 (made of steel, aluminum or the like) is inserted into linear section 90 until annual ridge 98 abuts its end. The closed end of cap 94 is then inserted in linear section 92 until the end of linear section 92 abuts ridge 98, and the thus formed assembly is welded to provide the overall rigid structural member 66.

Closed end 96 of cap 94 includes pins 102 and 103 firmly attached thereto, and spring 82 includes apertures 105 and 107 formed in the final coil thereof. Spring 82 includes apertures 109 and 111 at the opposite end thereof in the final coil of the spring thereat. Spring 82 is inserted into section 90 and manipulated until pins 102 and 103 enter apertures 105 and 107, respectively, thus rendering the spring substantially incapable of rotation.

Sealing unit 86 includes aluminum cap 113 threadably engagable in the end of section 90. Flexible seal 115 and plate bushing 116 is positioned around central bore 117 of unit 86 and ring seal 119 is positioned about the outer circumference thereof for sealing engagement with the inner wall of section 90.

Piston assembly 88 includes shaft 121 having connecting eye 123 threadably mounted therein and preferably permanently maintained thereat (using for example glue or the trademark product Loctite). Shaft 121 is slidably maintained through, but in a sealing relationship with, seal 115, and has piston 125 threaded thereon at threaded end 127 and maintained in substantially immovable contact therewith (again for example using glue or the Loctite product). Piston 125 includes retainer 131 and valve housing 133, valve housing 133 including sealing ring 135 mounted around the exterior thereof in annular depression 136 for sealing between valve housing 133 and the inner wall of section 90.

A plurality of apertures 137 open between rear wall 139 of valve housing 133 and rearward portion 141 of piston housing 143 (a fluid containment chamber defined by sealing units 84 and 86 and section 90).

Apertures 137 include unobstructed aperture 144 and valved apertures 145, 146 and 147. Balls 148 are urged toward detents at apertures 145, 146 and 147 by springs 149 (only one ball and spring set being shown, in aperture 146, it being understood that a like ball and spring set is positioned at each aperture 145, 146 and 147). Springs 149 are mounted and maintained between balls 148 and retainer 131.

As may be appreciated, when shaft 121, and thus piston 125, are pushed inward toward sealing unit 84, all four apertures will pass fluid from housing portion 151 to portion 141 (balls 148 being urged out of contact with the detents at apertures 145, 146 and 147 to allow fluid passage through the apertures). On the return stroke (in the direction of bias of spring 82), balls 148 are urged into sealing contact with the detents at apertures 145, 146 and 147, and thus only valve 144 passes fluid between the housing portions. In this manner a slow rebound but more rapid compressing dampening effect is provided.

Response adjustment mechanism 153 is mounted on threaded portion 127 of shaft 121 and includes pins 155 and 159 connected thereto for receipt in apertures 109 and 111, respectively, of spring 82 (thus rendering mechanism 153 substantially incapable of rotation). Mechanism 153 is, however, freely linearly movable on threaded portion 127 of shaft 121 responsive to manipulation by a user of the system of eye 123 upon disconnection of master link 161. By rotation of shaft 121, mechanism 153 is moved relative to piston 125 and either toward or away from sealing unit 84 (depending upon the direction of rotation of the shaft by the user), thus allowing user control of the response characteristics of the shock absorbing mechanism, for example to accommodate different road conditions and/or rider weight, by effectively adjusting the preload (minimum spring compression) on spring 82 (and overall, preferably providing rear wheel travel of up to about 5 inches).

Where it may be desirable to allow for shock lockout (total hydraulic lock-out of movement of piston 125), neoprene ring seal 163 may be provided on neck 165 of mechanism 153. When mechanism 153 is moved into contact with rear wall 139 of piston 125, ring seal 163 covers and seals apertures 144, 145, 146 and 147, thus disallowing passage of any fluid between portions 141 and 151 of piston housing 143 thereby hydraulically locking out movement of piston 125. Where it is not desired to have a system which can lock out shock absorption, sealing ring 163 is merely removed from mechanism 153, shoulder 165 abutting wall 139 inwardly of the apertures thus always allowing passage of fluid between sections of the housing when piston 125 is in motion.

Master link 161 connects shaft connecting eye 123 with barrel 62 of rear wheel mounting framework 40 thus simply and effectively translating the arcuate motion of rear wheel framework 40 to linear motion of shaft 121.

When piston housing 143 is substantially entirely filled with fluid (for example any known oil utilized for such purposes) and sealed by unit 86, a fluid damped shock absorber is established in section 90 of linear structural member 66. As may be appreciated, an improved suspension system and method for bicycles is thus provided which is user adjustable to provide a range of system response characteristics, which is more durable, and which fully suspends both front and rear wheels of the bicycle.

What is claimed is:

1. A suspension system for a bicycle having a plurality of substantially linear structural members forming a rigid main frame, wheels, a wheel mounting framework connected with the main frame, a handle bar assembly, and a seat, at least a portion of one of the linear structural members that extends from below the seat to the handle bar assembly being hollow, said suspension system comprising:

a piston assembly including a shaft releasably connected with the framework at one end of said shaft and having a manipulable portion adjacent to said one end and outside of the portion of the one of the linear structural members, a piston connected with said shaft and positioned in the portion of the one of the linear structural members, and fluid sealing means positioned at the portion of the one of the linear structural members and on opposite sides of said piston therein for maintaining fluid in the portion of the one of the linear structural members and defining a fluid containment chamber, said chamber receiving and containing therein all of said fluid necessary for suspension system function; and means for biasing said piston toward a selected position in the portion of the one of the linear structural members and including preload adjusting means operatively associated with said shaft for rider adjustment of preload of said biasing means, said preload adjusting means having an adjustable shock response mechanism positioned adjacent to said piston in the one of the linear structural members that is selectively positionable relative to said piston by a user accessing said manipulable portion of said shaft to selectively change the position of said mechanism relative to said piston.

2. The suspension system of claim 1 wherein said one of the linear structural members includes first and second substantially linear sections, at least said first linear section having said hollow portion thereat, and wherein said sealing means includes first and second sealing means, said first sealing means for sealing one end of said first linear section and said second sealing means for sealing an opposite end of said first section while also rigidly joining said first section to said second section.

3. The suspension system of claim 1 wherein said biasing means includes a spring unrotatably mounted between said mechanism and said sealing means.

4. The suspension system of claim 1 wherein said piston includes a plurality of apertures at least one of which is unobstructed for passage of fluid through said piston in either direction therethrough and at least another of which is valved to allow passage of fluid through said piston in only one direction therethrough.

5. The suspension system of claim 1 further comprising a link releasably linking said one end of said shaft to a position on the framework for maintaining and spanning a distance between said shaft and said framework position and translating arcuate motion of the framework to linear motion of said shaft.

6. The suspension system of claim 1 wherein said preload adjusting means includes means for selectively preventing movement of said piston in said fluid containment chamber.

7. A suspension system for a bicycle having a main frame, a rear wheel framework pivotably connected with the main frame, a foot crank assembly, a handle bar assembly, and a seat, the main frame having a plurality of structural members including a hollow member extending from below the seat to the handle bar assembly, said suspension system comprising shock absorbing means in part defined by a portion of the hollow structural member of the main frame and including:

a shaft connected with said rear wheel framework at one end thereof;

a piston connected to said shaft and slidably disposed adjacent to an inner wall of said portion of the hollow structural member, said piston including a plurality of apertures at least one of which is unobstructed for passage of fluid through said piston in either direction therethrough and at least another of which is valved to allow passage of fluid through said piston in only one direction therethrough;

biasing means in said portion of the hollow structural member for biasing said piston toward a selected position;

preload adjusting means operatively associated with said shaft for rider adjustment of preload on said biasing means; and first and second fluid sealing means in said portion of the hollow structural member on opposite sides of said piston therein relative to one another and each forming a seal against said inner wall thereof for defining, together with at least a part of said inner wall of said portion of the hollow structural member, a fluid containment chamber to receive and contain therein suspension system fluid.

8. The suspension system of claim 7 wherein the bicycle further includes a front wheel mount, said system further comprising second shock absorbing means mounted between the handlebar assembly and the front wheel mount.

9. The suspension system of claim 7 wherein the main frame has a first member having the seat adjacent to one end thereof and the foot crank assembly at another end thereof, said hollow structural member extending from said first member below the seat to the handle bar assembly, a second member extending from the handle bar assembly to the foot crank assembly, and a third member attached to said second member and to said first member at a position spaced a selected distance from the foot crank assembly, said third member having a part extending therefrom beyond said first member, the rear wheel framework being pivotably connected with said part of said third member of said main frame.

10. The suspension system of claim 7 further comprising a single link unit connectable in a space between said shaft and said framework for translating arcuate motion of said framework to linear motion of said shaft.

11. The suspension system of claim 7 wherein said biasing means is a spring abutting said preload adjusting means, said preload adjusting means being connected with said shaft for linear movement of said adjusting means to selectively position said adjusting means in said portion of the hollow structural member thus establishing a selected minimum spring compression.

12. The suspension system of claim 9 wherein said bicycle has a chain and a plurality of gears, said chain defining an upper chain line, and wherein said pivotable connection of the rear wheel framework and said part of said third structural member is above said upper chain line when said chain is engaged with at least some of said gears.

13. A method for fluid damped absorption of shock encountered by a bicycle moving over an uneven surface, the bicycle having a chain, a handle bar assembly, a seat, a plurality of substantially linear structural members forming a rigid main frame, and a rear wheel mounting framework pivotably connected with the main frame, at least a portion of one of the structural members that extends from below the seat to the handle bar assembly being hollow, said method comprising:

containing in the portion of the one of the linear structural members all fluid necessary to provide desired shock absorbing characteristics;

positioning a piston assembly in the portion of the one of the linear structural members, said piston assembly including a shaft connectable between the framework and a piston movable in said fluid;

releasably connecting said shaft at one end thereof with the rear wheel mounting framework;

providing means for biasing said piston toward a selected position in the portion of the one of the linear structural members; and selectively adjusting preload of said biasing means by preload adjusting means operatively associated with said shaft and positioned in the portion of the one of the linear structural members adjacent to said piston assembly, said shaft being manipulated to selectively change the position of said preload adjusting means thereby to provide a range of different shock absorbing characteristics.

14. The method of claim 13 further comprising connecting the rear wheel mounting framework with the main frame at a position selected so that the point of connection is above the chain, and wherein said one of the linear structural members is a normally horizontally disposed reach-bar.

15. The method of claim 13 further comprising providing variable fluid flow through said piston depending upon direction of movement of said piston in said portion of the one of the linear structural members.

16. The method of claim 13 wherein the step of providing biasing means includes positioning a spring in said portion of the one of the linear structural members and adjacent to said preload adjusting means to bias said piston assembly in a selected direction.

* * * * *